United States Patent Office 3,531,306
Patented Sept. 29, 1970

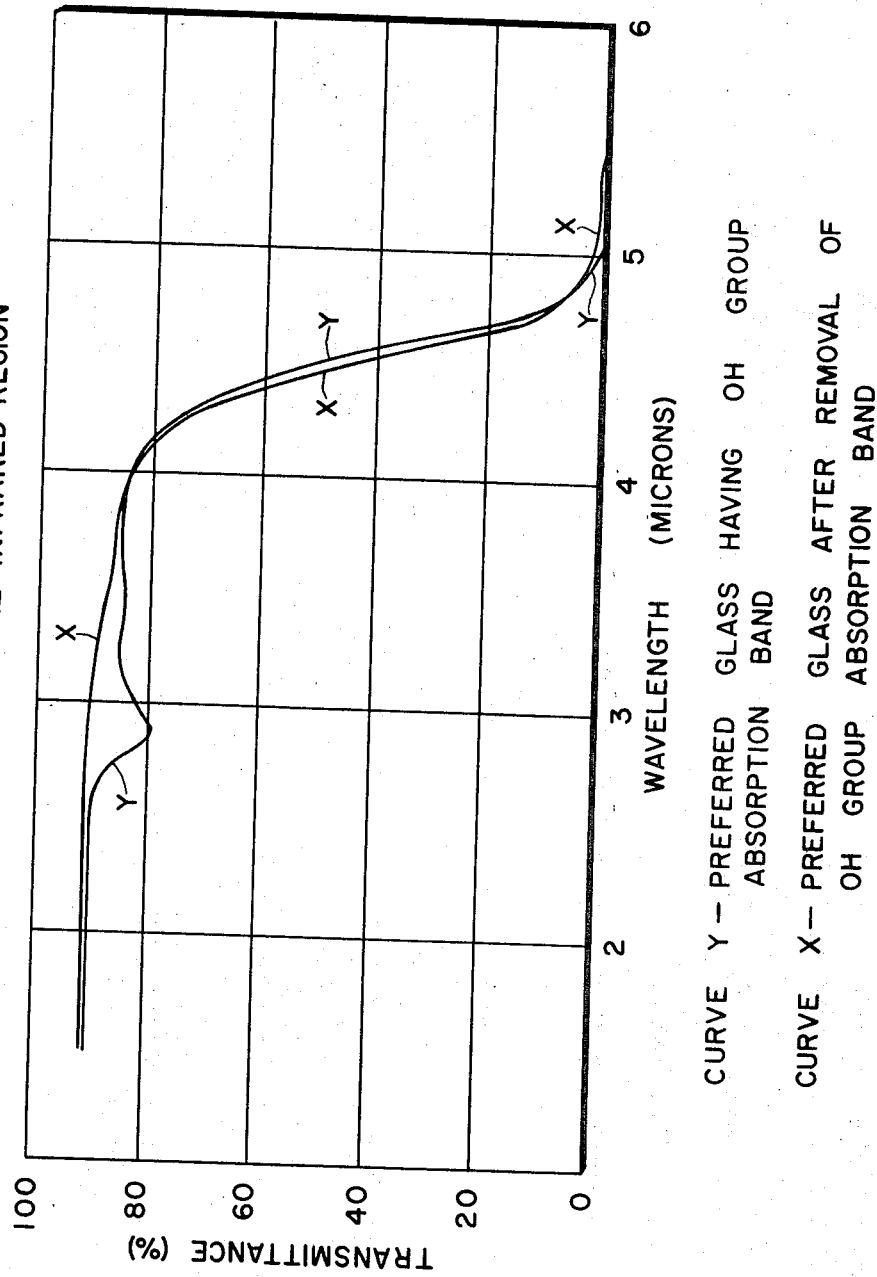

3,531,306
METHOD OF MAKING INFRARED TRANS-MITTING SILICATE GLASSES
William H. Dumbaugh, Jr., Corning, N.Y., assignor to Corning Glass Works, Corning, N.Y., a corporation of New York
Filed Dec. 29, 1966, Ser. No. 605,677
Int. Cl. C03c 3/04
U.S. Cl. 106—52                    4 Claims

ABSTRACT OF THE DISCLOSURE

A method of improving the infrared transmittance of a glass body consisting essentially as calculated from the batch on the oxide basis of 35–45 mole percent silica, 10–30 mole percent aluminum oxide and 30–40 mole percent calcium oxide. The method involves mixing the batch ingredients together with an effective amount of a chemically reactive, chlorine containing agent and melting the batch at the glass fusion temperatures in the presence of a dry atmosphere flowing directly over the glass melt.

---

This invention relates to improved infrared transmitting glasses and more particularly to glasses based on a calcium oxide-aluminum oxide-silica system having a low water content.

Glasses which have good infrared transmitting properties are being widely used in various industries, for example, for infrared illumination and signaling. These glasses also have specific military uses. However, for the latter purposes the glass is required to have certain other physical properties. It is necessary that the glass be substantially resistant to thermal shock by exposure to rapid heating and cooling without breakage. Thus one requirement is that the glass have an expansion coefficient below about $80 \times 10^{-7}$ per degree C. over a temperature range between 0° and 300° C.

It has been reported by E. B. Shand in "Glass Engineering Handbook," McGraw-Hill (1958), 62, that absorption in the infrared region for silicate glasses becomes practically complete at wave lengths between 4 and 5 microns. As an illustration, the author shows the transmittance curve of a 96% silica glass having a transmittance of approximately 40% at a wave length of 3.5 microns and 30% at a wave length of 4 microns. While this glass may be useful for some purposes, it does not meet the requirements for certain military uses wherein the glass should have an infrared transmittance of at least 80% at a wave length of 3.5 microns and at least 70% transmittance at a wave length of 4.0 microns for a 2 millimeter thickness of glass.

In my copending application, Ser. No. 439,207, filed on Mar. 12, 1965, I have described particular silicate glasses based upon the calcium oxide-aluminum oxide-silica system, which have the above infrared transmission requirement. Such glasses, in addition, have a coefficient of expansion sufficiently low to prevent breakage as a result of thermal shock. However, these glasses unfortunately have an undesirable infrared absorption band, in the region of 2.75–2.95 micron wave length, due to the presence of water in the glasses.

Particularly, residual water causes a strong absorption of infrared at a wave length of about 2.9 microns, resulting in a sharp break in the transmittance curve. Absorption, or conversely transmittance at a wave length of 2.6 microns is relatively insensitive to the low concentrations involved in residual water. Residual water content may therefore be specified in terms of an absorption coefficient, hereafter called "beta value" and designated "$B_{OH}$," which is calculated from the formula:

$$B_{OH} = \frac{1}{t} \log_{10} \frac{T_{2.6}}{T_{2.9}}$$

wherein $t$=glass thickness in mm.
$T_{2.6}$=transmittance in percent at 2.6 microns
$T_{2.9}$=transmittance in percent at 2.9 microns
and $B_{OH}$ is in terms of mm.$^{-1}$.

It is therefore an object of the present invention to provide an improved infrared transmitting glass in which the water absorption band has been substantially removed.

It is a further object of the present invention to provide a method of substantially removing the water absorption band of an infrared transmitting glass.

In accordance with the present invention, I have discovered an improved method of making an infrared transmitting glass body, consisting essentially on the oxide basis as calculated from the batch of 35–45 mole percent silica, 10–30 mole percent aluminum oxide, and 30–40 mole percent calcium oxide, by mixing the batch ingredients together with an effective amount of a chemically reactive chlorine containing agent and melting the glass at the fusion temperatures in the presence of a dry atmosphere flowing directly over the glass melt. The novel infrared transmitting glass body prepared by this method, in a section 2 millimeters in thickness, has an 80% transmittance at a wave length of 3.5 microns, at least a 70% transmittance at a wave length of 4.0 microns, and a maximum $B_{OH}$ value of 0.020 mm.$^{-1}$.

The ranges of ingredients are considered to be critical. The amount of silica present in the glass composition should be from 35–45 mole percent. When less than 35 mole percent is present, there is a great tendency for the glass to devitrify, whereas an amount greater than 45 mole percent results in the infrared transmittance becoming considerably reduced to the point where the glass no longer meets the above requirements. The aluminum oxide portion should range between 10–30 mole percent. Less than 10% aluminum oxide causes the glass to devitrify, but more than 30% causes the melting temperature to become excessively high for commercial melting tanks. Finally, the calcium oxide content should range between 30–40 mole percent. When less than 30 mole percent is present, the liquidus is raised too high for melting and there is a tendency toward devitrification, whereas the presence of more than 40% makes it too difficult to form a glass. In addition it was found that the thermal expansion of the glass increases with increasing amounts of calcium oxide towards the maximum desired value.

In order to form the novel glass of this invention proper selection of batch materials is required. Thus hydrated materials such as alumina hydrate and calcium hydroxide must be avoided since these have a large effect on the water content of the glass. The type of sand and calcined alumina can also affect water content, but to a much lesser extent than the hydrated materials.

Various modifications of the base ternary calcium oxide-aluminum oxide-silica system may be made by the addition of minor amounts of up to about seven mole percent of certain other oxides. Thus substitution for calcium oxide by an equal amount of other alkaline earth metal oxides, such as, magnesium oxide, strontium oxide and barium oxide may be made. Also zinc oxide and cadmium oxide may be added in amounts of up to seven mole percent. Other oxides which may similarly be added include lanthanum oxide, titanium oxide and germanium oxide.

A preferred glass composition is as calculated on the oxide basis: 36.9 mole percent silica, 26.8 mole percent aluminum oxide and 36.3 mole percent calcium oxide. This composition has a liquidus of about 1380° C. At wave lengths of 3.5 to 4 microns the preferred glass is well above the minimum requirements for the infrared transmitting glass set forth above. The transmittance in the 4 to 5 micron region is as good or better than any silicate glass of technical importance. The cut-off in this region is due to a strong absorption band of the Si—O vibration which peaks at about 9 microns, but the actual transmittance limit for these glasses in ordinary thicknesses is determined by absorption in the first overtone region which for practical purposes places the limit at about 5 microns. Therefore, to obtain good transmittance in the desired infrared region, it is important to have a relatively low silica content. The preferred glass represents the lower practical limit of silica content in the ternary system for a glass which has good weathering properties, that can be cast into articles, and whose expansion coefficient is not prohibitively high. As the silica content is reduced below that of the preferred composition, i.e. 36.9 mole percent, the liquidus climbs rapidly to over 1500° C. and does not dip below 1500° C. until the silica content is lower than about 10 percent which, for practical purposes, makes it very difficult to form glasses of good quality in this region.

The accompanying drawing illustrates the improvement in the infrared transmittance of silicate glass prepared according to the present invention.

Referring to the drawing, the transmittance of glasses 2.0 mm. thick in the infrared region is shown as follows:

Curve Y represents the percent transmittance of the preferred composition having OH group absorption band.

Curve X represent the percent transmittance of the preferred composition after removal of OH group absorption band.

It is essential, in making infrared transmitting glasses having a maximum $B_{OH}$ value of 0.020 mm.$^{-1}$ by my novel process, that the batch ingredients initially be mixed together with a chemically reactive, chlorine containing agent. As used herein this agent is a compound which is capable of reacting during melting to replace the OH groups present in the glass network. The reaction may be illustrated as follows:

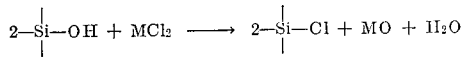

The preferred agent is anhydrous calcium chloride which is typically mixed in powder form with the glass batch. An amount of chlorine at least equivalent to 4 mole percent $CaCl_2$ is necessary to substantially remove the OH group as described hereinabove; however no more than an amount of chlorine equivalent to seven mole percent of $CaCl_2$ is useful. Since it is very hygroscopic, it is important that the calcium chloride or the batch containing it not be exposed to moisture for any length of time. Other agents which can be used include the chlorides of the other alkaline earth metals, zinc, cadmium, lanthanum, and aluminum. Thus, for example any of the other alkaline earth chlorides can be substituted for an equal amount of calcium oxide in the base composition without detrimentally affecting the required properties of the product.

During the melting of the batch at the fusion temperature of about 1500°–1650° C., it is necessary that a dry atmosphere flow directly over the glass melt. This is essential to remove any of the water formed by the reaction with the chlorine containing agent from the reaction zone and to prevent any other moisture from reaching the surface. By flowing the dry gas directly over the glass melt, a low water vapor pressure is maintained and the water is removed rapidly to displace the reaction equilibrium in favor of substantial complete substitution of chlorine for the OH group. Dry atmospheres useful herein include dry or dried gases, such as air, nitrogen helium, argon, oxygen, carbon dioxide and sulfur dioxide. While the rate of flow of the dry atmosphere depends on many factors, such as the size and surface area of the vessel or furnace in which the glass is being fused, there should be a sufficient flow to adequately remove the water vapor which has formed.

The fused glass is then subjected to conventional glass forming techniques. It can be cast into a desired shape, conventionally annealed, and subjected to grinding and polishing. The preferred glass product then formed is a unique infrared transmitting glass having a transmission at 2.9 microns of greater than 86 percent and a water content of less than $B_{OH}$ value of 0.010 mm.$^{-1}$.

My invention is further illustrated by the following examples.

EXAMPLE I

A glass composition was prepared and melted from the following formulation:

| Oxide | Weight percent | Mole percent | Batch materials | Weight, grams |
|---|---|---|---|---|
| $SiO_2$ | 31.8 | 36.91 | Kona acid washed sand | 150.0 |
| $Al_2O_3$ | 39.2 | 26.80 | Alcoa T-61 calcined alumina | 196.0 |
| CaO | 29.2 | 36.29 | Calcium carbonate | 281.6 |

The batch materials were weighed and mixed by ball milling for four hours. Then the batch was melted in a platinum crucible in a platinum-20 rhodium wound resistance furnace at a temperature of 1550° C. for a period of four hours. Thereafter the molten glass was poured into plates in an iron mold and annealed at a temperature of 832° C.

The infrared properties of the glass are shown in the drawing and have been designated as Curve Y. Other properties of the glass product were determined using standard testing methods and are set forth in the table below.

TABLE I

Linear expansion coefficient:
  (25°–300° C.)—$59.5 \times 10^{-7}$/° C.
  (25°–700° C.)—$72 \times 10^{-7}$/° C.
Softening point (extrapolated)—981° C.
Annealing point—832° C.
Strain point—800° C.
Density—2.798 g./cm.$^3$
Young's modulus—$14.3 \times 10^6$ p.s.i.
Shear modulus—$5.6 \times 10^6$ p.s.i.
Poisson's ratio—0.28
Knoop hardness:
  100 g.—657.5
  500 g.—601
Dielectric constant:
  1 mc.–25° C.—8.87
  1 mc.–500° C.—9.51
  8600 mc.–25° C.—8.84
Loss tangent:
  1 mc.–25° C.—0.0025
  1 mc.–500° C.—0.0029
  8600 mc.–25° C.—0.011
Log DC resistivity (ohm-cm.):
  250° C.—18.0
  350° C.—15.0
  500° C.—11.8
Refractive index:
  5893 A.—1.60475
  4861 A.—1.61251
  6563 A.—1.60151
Nu value—54.98

EXAMPLE II

An improved infrared transmitting glass composition was prepared and melted from the following formulation:

| Constituent | Weight percent | Mole percent | Batch materials | Weight, grams |
|---|---|---|---|---|
| $SiO_2$ | 30.55 | 36.91 | Berkeley fine dry sand | 91.84 |
| $Al_2O_3$ | 37.64 | 26.80 | Alcoa T-61 calcined alumina | 113.26 |
| CaO | 24.17 | 31.29 | Calcium carbonate | 129.95 |
| $CaCl_2$ | 7.64 | 5.00 | Calcium chloride | 22.92 |

The batch materials were weighed and mixed by ball milling for four hours.

The substantially homogeneously mixed batch containing the chemically reactive, chlorine containing agent was then transferred into a platinum crucible, placed in a platinum-rhodium wound tube furnace, and heated at a temperature of 1550° C. As the batch was being melted, dry nitrogen gas was continuously flowing directly over the surface of the melt at a rate of 100 cc./min. After four hours, the nitrogen flow tube was removed, the melt was immediately poured into an iron mold and then the glass was annealed by slowly cooling from 832° C.

The infrared properties of the glass are shown in the drawing and have been designated as Curve X. A comparison between Curve X and Curve Y indicate that the method of the present invention almost completely removes the OH group absorption band in the region of 2.9 microns. The difference of absorption is calculated as follows:

| | Drying agent | $B_{OH}$ |
|---|---|---|
| Glass: | | |
| Ex. I | None | 0.05 |
| Ex. II | $CaCl_2$ | <0.01 |

The other properties of glass of Example II are substantially identical to those of Example I.

EXAMPLE III

An infrared transmitting glass body was made following the procedure and using the formulation of Example II, with the exception that five mole percent of aluminum chloride was substituted as the chemically reactive, chlorine containing agent. A piece of the glass product 2 mm. in thickness exhibited a $B_{OH}$ value of 0.01 mm.$^{-1}$. Thus aluminum chloride is just about as effective as for this purpose as calcium chloride.

EXAMPLE IV

Following the procedure and using the formulation of Example II, experiments were conducted to determine the effect of various gases and the effect of the location of the gas flow upon the water content of the glass. The data and the results are set forth in the table below.

| | Flow position | Flow rate, cc./min. | $B_{OH}$ value |
|---|---|---|---|
| Gas: | | | |
| $N_2$ | Directly over surface | 100 | <0.01 |
| $N_2$ | do | 50 | 0.02 |
| $N_2$ | Side of crucible | 50 | 0.04 |
| He | Directly over surface | 100 | 0.02 |
| $O_2$ | do | 100 | 0.01 |
| Air (dry) | do | 100 | <0.01 |
| Air (wet) | Furnace atmosphere | None | 0.05 |

These results show that when the dry gas was flowing directly over the surface of the melt, the $B_{OH}$ value was not greater than 0.02; however when the dry gas was flowing along the side of the crucible or when melting was performed in the presence of a wet gas, the $B_{OH}$ value was substantially greater than the requirements. Thus it may be concluded that it is essential that the dry gas flow directly over the surface of the melt to efficiently remove escaping water and prevent any other water from reaching the surface.

I claim:

1. In a method of making an infrared transmitting glass body having at least an 80% transmittance at a wavelength of 3.5 microns and at least a 70% transmittance at a wavelength of 4.0 microns for a 2 millimeter thickness of said glass and consisting essentially on the oxide basis as calculated from the batch of 35–45 mole percent silica, 10–30 mole percent aluminum oxide, and 30–40 mole percent of calcium oxide, the improvements comprising
    (a) mixing the batch ingredients together with an effective amount of a solid chemically reactive, chloring containing agent, said amount being equivalent to 4–7 mole percent of calcium chloride, and
    (b) melting the batch at the glass fusion temperatures in the presence of a dry atmosphere flowing directly over the glass melt,
such that the glass body formed from said melt has a maximum $B_{OH}$ value of 0.02 mm.$^{-1}$.

2. The method of claim 1, wherein said chlorine containing agent is a member selected from the group consisting of the chlorides of alkaline earth metals, zinc, cadmium, lanthanum and aluminum.

3. The method of claim 1, wherein said dry atmosphere is dry air, nitrogen, helium, argon, oxygen, carbon dioxide and sulfur dioxide.

4. The method of claim 1 wherein said chlorine containing agent is anhydrous calcium chloride and said dry atmosphere is nitrogen.

References Cited

UNITED STATES PATENTS

| 2,982,053 | 5/1961 | Elmer | 65—30 X |
| 3,338,694 | 8/1967 | Davy | 106—39 X |

HELEN M. McCARTHY, Primary Examiner

W. R. SATTERFIELD, Assistant Examiner

U.S. Cl. X.R.
65—134; 106—47